United States Patent
Wu et al.

(10) Patent No.: US 9,316,763 B2
(45) Date of Patent: Apr. 19, 2016

(54) SUBMARINE TOPOGRAPHY SIX-DIMENSIONAL GRID MAPPING METHOD

(71) Applicant: THE SECOND INSTITUTE OF OCEANOGRAPHY, SOA, Hangzhou, Zhejiang Province (CN)

(72) Inventors: Ziyin Wu, Hangzhou (CN); Jiabiao Li, Hangzhou (CN); Shoujun Li, Hangzhou (CN); Jihong Shang, Hangzhou (CN); Xiaowen Luo, Hangzhou (CN)

(73) Assignee: THE SECOND INSTITUTE OF OCEANOGRAPHY, SOA, Hangzhou, Zhejiang Province (CN)

( * ) Notice: Subject to any disclaimer, the term of this patent is extended or adjusted under 35 U.S.C. 154(b) by 0 days.

(21) Appl. No.: 14/415,538

(22) PCT Filed: Nov. 28, 2013

(86) PCT No.: PCT/CN2013/088057
§ 371 (c)(1),
(2) Date: Jan. 16, 2015

(87) PCT Pub. No.: WO2014/106415
PCT Pub. Date: Jul. 10, 2014

(65) Prior Publication Data
US 2015/0192691 A1 Jul. 9, 2015

(30) Foreign Application Priority Data
Jan. 6, 2013 (CN) .......................... 2013 1 0004170

(51) Int. Cl.
*G01V 9/00* (2006.01)
*G01C 13/00* (2006.01)
*G01V 99/00* (2009.01)

(52) U.S. Cl.
CPC *G01V 9/00* (2013.01); *G01C 13/00* (2013.01); *G01V 99/005* (2013.01)

(58) Field of Classification Search
CPC ....... G01N 9/00; G01N 11/00; G01N 99/005; G01N 1/00; G01N 1/28; G01N 1/34; G01N 1/345; G01N 1/38; G01N 1/3808; G06T 17/05; G01S 17/89; G01S 15/8902
See application file for complete search history.

(56) References Cited

U.S. PATENT DOCUMENTS

2014/0269191 A1 * 9/2014 Iverson et al. .................. 367/88

FOREIGN PATENT DOCUMENTS

| CN | 102446367 A | 5/2012 |
| CN | 103093410 A | 5/2013 |

*Primary Examiner* — Manuel L Barbee
(74) *Attorney, Agent, or Firm* — Jiwen Chen

(57) ABSTRACT

The present invention discloses a submarine topography six-dimensional grid mapping method, and particularly to a method based on known discrete bathymetric data points. According to the present invention, a submarine topography six-dimensional grid mapping method including X-coordinate, Y-coordinate, water depth, slope, second derivative and measuring time is established, a submarine topography three-dimensional grid on the basis of discrete water depth data and measuring time is formed, and then submarine slope and second derivative of each grid point are calculated and the measuring time is superposed simultaneously, thus forming a submarine topography six-dimensional grid technical method. The present invention comprises a plurality of steps: establishing a submarine topography six-dimensional grid structure and a topography dimension grid, establishing a time dimension grid, establishing a slope dimension grid, and establishing a second derivative dimension grid. The present invention has the advantages of being accurate in mapping data, convenient to operate, wide in application range, little in influence of natural weather and the like in the process of Chinese coastal mapping and marine demarcation.

1 Claim, 3 Drawing Sheets

SUBMARINE TOPOGRAPHY SIX-DIMENSIONAL GRID MAPPING METHOD

This is a U.S. national stage application of PCT Application No. PCT/CN2013/088057 under 35 U.S.C. 371, filed Nov. 28, 2013 in Chinese, claiming the priority benefit of Chinese Application No. 201310004170.2, filed Jan. 6, 2013, which is hereby incorporated by reference.

TECHNICAL FIELD

The present invention relates to a submarine topography six-dimensional grid mapping method including X-coordinate, Y-coordinate, water depth, slope, second derivative and measuring time, and particularly to a technical method, which particularly forms a submarine topography three-dimensional grid on the basis of discrete water depth data and measuring time, and then calculates submarine slope and second derivative of each grid point, and simultaneously superposes the measuring time, thus forming a submarine topography six-dimensional grid technical method and storing in a rational structure. The present invention relates to the technical fields of marine mapping, computer graphics, submarine science and the like.

BACKGROUND ART

A submarine topography three-dimensional grid has wide applications and a submarine topography grid is applied to any field related to the submarine topography, for example: mapping of foundation maps such as submarine topography map, water depth chart and submarine geomorphological map and the like, visual display of the submarine topography, submarine topography walkthrough, and even including digital earth and digital marine that both require the submarine topography as a supporting foundation. According to different grid forming manners, the submarine topography grid includes square grid and triangle grid. Because the square grid is easy for use and data exchange, the square grid, which is also called grid or gridding, is mostly used in present submarine topography mapping. There is various data that builds the submarine topography grid, for example: single-beam sounding, multi-beam sounding, historical topography map and the like.

The submarine topography grid plays a very important role in marine mapping, marine charting, submarine scientific studies, computer visualization and the like. However, with the requirement for broader application and further research, the submarine topography three-dimensional grid cannot satisfy the current demands. For instance: the topography changes frequently in estuary regions; therefore, the temporal and spatial variation of the submarine topography cannot be studied unless time is added in the submarine topography three-dimensional grid to form a four-dimensional grid. For another instance: the continental margin is the core area for marine demarcation which needs to determine the foot point of the continental slope. Slope and second derivative are the basic parameters to determine the foot point of the continental slope. At this time, the demarcation between the continental slope and the sea basin cannot be studied unless the slope and second derivative are added in the submarine topography three-dimensional grid to establish a five-dimensional grid, thus accurately determining the position of the foot point of the continental slope. For a further instance: during a submarine charting process, it is difficult to prepare the submarine topography map, slope map and second derivative map by only depending on the submarine topography three-dimensional grid, and a five-dimensional grid including topography, slope and second derivative needs to be used.

Upon the analysis on the basis of retrieved public data, there is no mature technical method for establishing a submarine topography six-dimensional grid including X-coordinate, Y-coordinate, topography, slope, second derivative and time at present.

SUMMARY OF THE INVENTION

The present invention aims at the defects of the prior art and provides a submarine topography six-dimensional grid mapping method which is formed by firstly establishing a submarine topography grid on the basis of discrete water depth data measured, calculating slope and second derivative of each grid point on the basis of the submarine topography grid, and endowing/allocating time to each grid point according to the measuring time of water depth. A data storage structure is further designed, which can completely replace four grids including water depth, time, slope and second derivative which are separated mutually, and has the advantages of rational structure, small space and convenient use. The technical method can be applied to such fields as marine mapping, marine charting, marine demarcation, submarine scientific studies and computer graphics.

The present invention is achieved by the technical solution as follows.

A submarine topography six-dimensional grid mapping method, is characterized by comprising the steps as follows.

(1) Submarine Topography Six-Dimensional Grid Structure

Transmitting measured numerical values to a six-dimensional grid structure processing device through a submarine coordinate numerical value measuring instrument, wherein the processing device divides submarine coordinate measured data points into two parts, one part is a head structure "Head" for describing and storing integral/complete information of the grid structure, and the other part is a data set $$GRID(i, j) = \left\{ grid(i, j)_{\substack{i=1,M \\ j=1,N}} \right\}$$

for storing the grid.

The head structure "Head" consists of eight lines.

The first line refers to mark "Mark".

The second line refers to M and N, representing the line quantity and row quantity of the grid.

The third line refers to xmin and xmax, representing the minimum and maximum values of the X-coordinate of the grid.

The fourth line refers to ymin and ymax, representing the minimum and maximum values of the Y-coordinate of the grid.

The fifth line refers to zmin and zmax, representing the minimum and maximum values of the topography of the grid.

The sixth line refers to tmin and tmax, representing the minimum and maximum values of the time of the grid.

The seventh line refers to slpmin and slpmax, representing the minimum and maximum values of the slope of the grid; and The eighth line refers to secmin and secmax, representing the minimum and maximum values of the second derivative of the grid;

Storing the data set $$GRID(i, j) = \left\{ grid(i, j)_{i=1,M \atop j=1,N} \right\}$$

according to the space sequence of the data points in a two-dimensional orthographic projection plane, wherein each data point $grid_{(i,j)}$ comprises four parameters which are respectively water depth value $dep_{(i,j)}$, time value $time_{(i,j)}$, slope value $slp_{(i,j)}$ and second derivative value $sec_{(i,j)}$, and the X-coordinate value $x_{(i,j)}$ and the Y-coordinate $y_{(i,j)}$ value of the point are calculated according to the line number i and row number j thereof, wherein:

$$x_{(i,j)}=xmin+(i-1)\times xmean; xmean=(xmax-xmin)/(N-1);$$

$$y_{(i,j)}=ymin+(j-1)\times ymean; ymean=(ymax-ymin)/(M-1);$$

It can be seen from the conclusion above that the grid structure designed in the present invention is different from the traditional three-dimensional topography grid structure, wherein the data set $$GRID(i, j) = \left\{ grid(i, j)_{i=1,M \atop j=1,N} \right\}$$

has already comprised four grids including topography, time, slope and second derivative.

(2) Establishing of Topography Dimension Grid in the Six-Dimensional Grid

Employing an inverse distance weighting method to establish the topography dimension grid $DEP_{(i,j)}$:

$$dep_{(i,j)} = \left[ \sum_{k=1}^{n} w_k z_k \right] \bigg/ \sum_{k=1}^{n} w_k;$$

$$w_k = 1/d_k^2;$$

$$d_k = \sqrt{(x_{(i,j)} - x_k)^2 + (y_{(i,j)} - y_k)^2}$$

where $Z=\{z_k\}_{k=1,n}$ refers to a discrete water depth set, $x_k$ refers to the X-coordinate value of a discrete water depth data point, and $y_k$ refers to the Y-coordinate value of the discrete water depth data point, wherein each discrete water depth data point comprises water depth value $z_k$, X-coordinate value $x_k$, Y-coordinate value $y_k$ and measuring time $t_k$, which are external input variables; $w_k$ refers to the weighted value of the discrete water depth data point, which is a calculation variable.

Whether the data points in $Z=\{z_k\}_{k=1,n}$ participate in establishing the topography dimension grid $DEP_{(i,j)}$ is determined by an external variable measuring radius r and measuring time $t_k$. If topographical change is strongly correlated to the time, that is the topography dimension grid $DEP_{(i,j)}$ needs to be established according to the time value $t_k$ since the water depth $z_k$ differs largely in the same place when $t_k$ is different. That is, when $t_k=T$, the water depth $z_k$ participates in calculation only, wherein T refers to the data measuring time, which is an external variable. When the topographical change is weekly correlated to the time, the time value $t_k$ can be directly ignored. Under the two conditions, all the water depth data $z_k$ participating in calculation meets a distance rule that $d_k \leq r$, wherein r refers to a measuring radius.

Traverse the topography dimension grid $DEP_{(i,j)}$, obtain the minimum water depth value zmin and the maximum water depth value zmax and store into the structure Head.

(3) Establishing of Time Dimension Grid in the Six-Dimensional Grid

The time dimension grid $TIME_{(i,j)}$ is determined by the measuring time $t_k$ of the water depth data set $Z=\{z_k\}_{k=1,n}$ and can be established by two manners.

One manner is to directly assign the measuring time $t_k$ of the discrete data set to a time grid point $time_{(i,j)}$ according to when establishing the topography dimension grid $DEP_{(i,j)}$; that is, when $z_k$ participates in establishing the topography dimension grid $DEP_{(i,j)}$, $time_{(i,j)}=t_k$; while using this manner requires that the data measuring time on the same spatial position is consistent; that is, repeated measuring in same region at different time does not exist. In that case, the time dimension grid $TIME_{(i,j)}$ and the topography dimension grid $DEP_{(i,j)}$ are established synchronously.

Alternatively, another manner is to establish the time dimension grid $TIME_{(i,j)}$ after the topography grid $DEP_{(i,j)}$ is established. At this moment, the measuring time $t_k$ needs to be inputted in a manner of an external variable, which is usually implemented according to the principle of proximal sheet formation so as to ensure the continuity of data measuring and the processing of the water depth data after measuring. Spatially, the measuring time in one mapping region polygon "Poly" is generally identical. A time attribute is endowed to the mapping polygon "Poly", then polygon partitioning is carried out on the entire mapping region according to the measuring time to form a mapping polygon set $Poly=\{p_k\}_{k=1,n}$, wherein each polygon $p_k$ corresponds to one measuring time $t_k$; and then the time dimension grid $TIME_{(i,j)}$ is established. The mapping polygon $Poly=\{p_k\}_{k=1,n}$ is cycled, the polygon $p_k$ is taken out in sequence, then two-dimensional topography grid $DEP_{(i,j)}$ is cycled, wherein space and position matching is carried out between each water depth value $dep_{(i,j)}$ and $p_k$. When the water depth grid point $dep_{(i,j)}$ is located in the mapping polygon $p_k$, $time_{(i,j)}=t_k$. See the foregoing steps for the calculation of the X-coordinate value $x_{(i,j)}$ and the Y-coordinate value $y_{(i,j)}$ of the water depth grid point $dep_{(i,j)}$. The relation between the point and the polygon can be judged by employing a rotation angle method.

Employing the foregoing method to traverse the mapping polygon data set $Poly=\{p_k\}_{k=1,n}$, thus being capable of establishing the time dimension grid $TIME_{(i,j)}$.

Traversing the time dimension grid $TIME_{(i,j)}$, obtaining the minimum time value tmin and the maximum time value tmax and storing into the structure Head.

(4) Establishing of Slope Dimension Grid in the Six-Dimensional Grid

The slope dimension grid $SLP_{(i,j)}$ is established based on the topography dimension grid $DEP_{(i,j)}$. A calculation step length $step_{slp}$ i.e. line number and row number of the grid participating in the calculation needs to be externally inputted for calculating the slope dimension grid $SLP_{(i,j)}$. Usually, a square region is employed for calculation. Traversing the slope dimension grid $SLP_{(i,j)}$ takes the grid point $slp_{(i,j)}$ as a center and takes a square R1 using twice $step_{slp}$ as length and width to encircle a calculating point $slp_{(i,j)}$, and all the water depth points $dep_{(I,J)}$ falling within the square R1 need to participate in slope calculation. The maximum slope $slp max_{(i,j)}$ and the mean slope $slpmean_{(i,j)}$ of each grid point $slp_{(i,j)}$ can be calculated. All the water depth points $dep_{(I,J)}$ falling within the square R1 need to participate in slope calculation. The calculating formula of the slope $slp_{(I,J)}$ between each point $dep_{(I,J)}$ and the central point $dep_{(i,j)}$ is:

$$slp_{(I,J)} = \arctan[(dep_{(I,J)} - dep_{(i,j)})/dis]$$

$$dis = \sqrt{(x_{(i,j)} - x_{(I,J)})^2 + (y_{(i,j)} - x_{(I,J)})^2}$$

Where, $[x_{(i,j)}, y_{(i,j)}]$ and $[x_{(I,J)}, y_{(I,J)}]$ are respectively the coordinate values of the water depth points $dep_{(i,j)}$ and $dep_{(I,J)}$, and see the foregoing steps for the calculating method.

The slope value $slp_{(I,J)}$ of all the water depth points $dep_{(I,J)}$ in the square R1 is calculated. The mean value of the slope $slp_{(I,J)}$ of all the points in the square R1 is namely the mean slope $slpmean_{(i,j)}$ of the calculating point $dep_{(i,j)}$ and the maximum value is namely the maximum slope $sip\ max_{(i,j)}$ of this point. The mean slope $slpmean_{(i,j)}$ or the maximum slope $slp\ max_{(i,j)}$ may be endowed to the calculating point $slp_{(i,j)}$ upon demand.

Employing the foregoing method to traverse the topography dimension grid $DEP_{(i,j)}$, thus being capable of establishing the slope dimension grid $SLP_{(i,j)}$.

Traversing the slope dimension grid $SLP_{(i,j)}$, obtaining the minimum slope value slpmin and the maximum slope value slpmax, and storing into the structure Head.

(5) Establishing of Second Derivative Dimension Grid in the Six-Dimensional Grid The second derivative dimension grid $SEC_{(i,j)}$ can be obtained according to the same method in step (4) by taking the slope dimension grid $SLP_{(i,j)}$ calculated in step (4) as an input variable to replace the topography dimension grid $DEP_{(i,j)}$. Specially, the calculating method is as follows:

The calculating step length $step_{sec}$, i.e. line number and row number of the grid participating in the calculation needs to be set for calculating the second derivative dimension grid $SEC_{(i,j)}$. Usually, a rectangle region is employed for calculation. Taking the position of the calculating point $sec_{(i,j)}$ as a center and taking a square R2 using twice $step_{sec}$ as length and width to encircle the calculating point $sec_{(i,j)}$, and all slope points $slp_{(I,J)}$ falling within the square R2 participate in second derivative calculation, wherein all the slope points $slp_{(I,J)}$ within the square R2 participate in the second derivative calculation, and the calculating formula of the second derivative $sec_{(I,J)}$ between each point $slp_{(I,J)}$ and the central point $slp_{(i,j)}$ is:

$$sec_{(I,J)} = \arctan[(slp_{(I,J)} - slp_{(i,j)})/dis]$$

$$dis = \sqrt{(x_{(i,j)} - x_{(I,J)})^2 + (y_{(i,j)} - x_{(I,J)})^2}$$

Where, $[x_{(i,j)}, y_{(i,j)}]$ and $[x_{(I,J)}, y_{(I,J)}]$ are respectively the coordinate values of the slope points $slp_{(i,j)}$ and $slp_{(I,J)}$, and see the foregoing steps for the calculating methods.

The second derivative $sec_{(I,J)}$ of all the slope points $slp_{(I,J)}$ in the square R2 is calculated. The mean value of the second derivative $sec_{(I,J)}$ of all the points in the square R2 is namely the second derivative $sec\ mean_{(i,j)}$ of the calculating point $slp_{(i,j)}$ and the maximum value is namely the maximum second derivative $sec_{(I,J)}$ of this point. The mean second derivative $sec\ mean_{(i,j)}$ or the maximum $sec\ max_{(i,j)}$ may be endowed to the calculating point $sec_{(i,j)}$ upon demand.

Employing the foregoing method to traverse the slope dimension grid $SLP_{(i,j)}$, thus being capable of establishing the second derivative dimension grid $SEC_{(i,j)}$.

Traversing the second derivative dimension grid $SEC_{(i,j)}$, obtaining the minimum second derivative value secmin and the maximum second derivative value secmax, and storing into the structure Head.

A submarine topography multidimensional grid is widely required in multiple aspects including marine mapping, submarine topography and terrain investigation, submarine science, marine demarcation, marine monitoring, digital marine and the like. At present, the submarine three-dimensional grid cannot satisfy this demand. The present invention designs and realizes a submarine topography six-dimensional grid including water depth value, time value, slope value and second derivative value.

Advantageous effects: the present invention has the advantages of being accurate in mapping data, convenient to operate, wide in application range, little in influence of natural weather and the like in the process of Chinese coastal mapping and marine demarcation.

DETAILED DESCRIPTIONS OF THE PREFERRED EMBODIMENTS

The present invention is further descried hereunder by reference to embodiments.

Embodiment 1

A submarine topography six-dimensional grid mapping method, comprises the detailed mapping process as follows.

(1) Submarine Topography Six-Dimensional Grid Structure

Transmitting measured numerical values to a six-dimensional grid structure processing device through a submarine coordinate numerical value measuring instrument, wherein the processing device divides submarine coordinate measured data points into two parts, one part is a head structure "Head" for describing and storing integral information of the grid structure, and the other part is a data set $$GRID(i, j) = \left\{ grid(i, j)_{\substack{i=1,M \\ j=1,N}} \right\}$$

for storing the grid.

The head structure "Head" consists of eight lines.

The first line refers to mark "Mark".

The second line refers to M and N, representing the line quantity and row quantity of the grid.

The third line refers to xmin and xmax, representing the minimum and maximum values of the X-coordinate of the grid.

The fourth line refers to ymin and ymax, representing the minimum and maximum values of the Y-coordinate of the grid.

The fifth line refers to zmin and zmax, representing the minimum and maximum values of the topography of the grid.

The sixth line refers to tmin and tmax, representing the minimum and maximum values of the time of the grid.

The seventh line refers to slpmin and slpmax, representing the minimum and maximum values of the slope of the grid; and The eighth line refers to secmin and secmax, representing the minimum and maximum values of the second derivative of the grid;

Storing the data set $$GRID(i,j) = \left\{ grid(i,j)_{\substack{i=1,M \\ j=1,N}} \right\}$$

according to the space sequence of the data points in a two-dimensional orthographic projection plane, wherein each data point $grid_{(i,j)}$ comprises four parameters which are respectively water depth value $dep_{(i,j)}$, time value $time_{(i,j)}$, slope value $slp_{(i,j)}$ and second derivative value $sec_{(i,j)}$, and the X-coordinate value $x_{(i,j)}$ and the Y-coordinate $y_{(i,j)}$ value of the point are calculated according to the line number i and row number j thereof, wherein:

$$x_{(i,j)}=x\min+(i-1)\times x\text{mean}; x\text{mean}=(x\max-x\min)/(N-1);$$

$$y_{(i,j)}=y\min+(j-1)\times y\text{mean}; y\text{mean}=(y\max-y\min)/(M-1);$$

Figure 1:
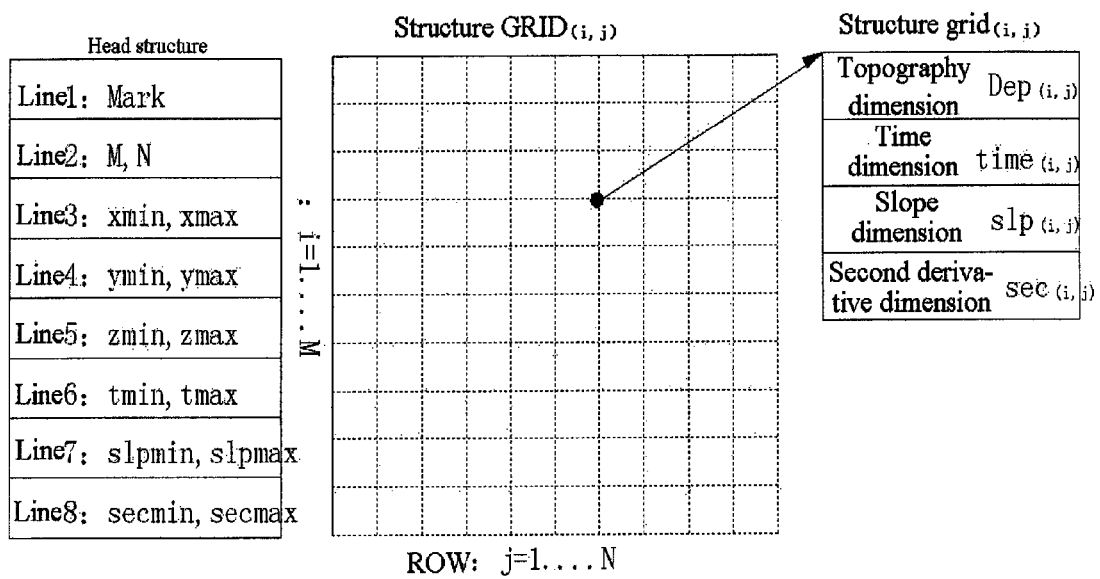
FIG. 1 is a drawing of a submarine topography six-dimensional grid structure in step (1) of embodiment 1 of the present invention.

The grid structure in the present invention is different from the traditional three-dimensional topography grid structure, wherein the data set $$GRID(i,j) = \left\{ grid(i,j)_{\substack{i=1,M \\ j=1,N}} \right\}$$

has already comprised four grids including topography, time, slope and second derivative. The submarine topography six-dimensional grid established is as shown in FIG. 1.

(2) Establishing of Topography Dimension Grid in the Six-Dimensional Grid

Employing an inverse distance weighting method to establish the topography dimension grid $DEP_{(i,j)}$:

$$dep_{(i,j)} = \left[\sum_{k=1}^{n} w_k z_k\right] \Big/ \sum_{k=1}^{n} w_k;$$

$$w_k = 1/d_k^2;$$

$$d_k = \sqrt{(x_{(i,j)} - x_k)^2 + (y_{(i,j)} - y_k)^2}$$

where $Z=\{z_k\}_{k=1,n}$ refers to a discrete water depth set, $x_k$ refers to the X-coordinate value of a discrete water depth data point, and $y_k$ refers to the Y-coordinate value of the discrete water depth data point, wherein each discrete water depth data point comprises water depth value $z_k$, X-coordinate value $x_k$, Y-coordinate value $y_k$ and measuring time $t_k$, which are external input variables; $w_k$ refers to the weighted value of the discrete water depth data point, which is a calculation variable; the above-mentioned water depth value $z_k$, X-coordinate value $x_k$ and Y-coordinate value $y_k$ are determined by the measuring of the submarine coordinate numerical value measuring instrument, and the time $t_k$ is determined by a clock.

If topographical change is strongly correlated to the time, establishing the topography dimension grid $DEP_{(i,j)}$ according to the time value $t_k$; that is, when $t_k$=T, the water depth $z_k$ participates in the calculation, T refers to the data measuring time, which is an external variable.

If the topographical change is weekly correlated to the time, the time value $t_k$ does not participate in the calculation.

In the foregoing two cases that the topographical change is strongly correlated to the time and the topographical change is weekly correlated to the time, all the water depth data participating in calculation meets a distance rule, wherein r refers to a measuring radius.

All the water depth data $z_k$ participating in calculation meets a distance rule that $d_k \leq r$, wherein r refers to a measuring radius.

Figure 2:
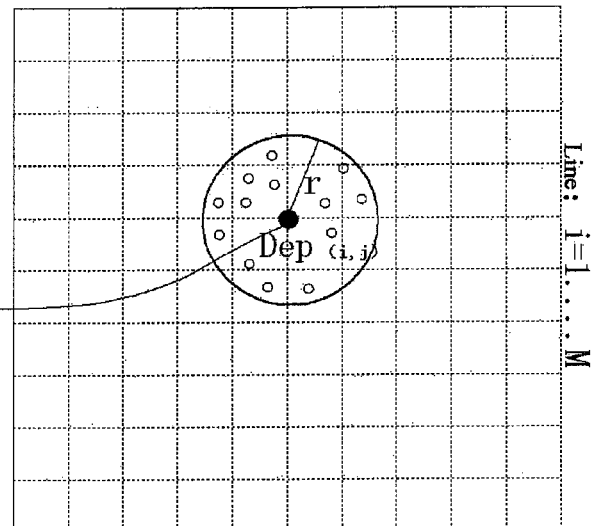
FIG. 2 is establishing of topography dimension grid via discrete water depth in step (2) of embodiment 1 of the present invention.

Traversing the topography dimension grid $DEP_{(i,j)}$, obtaining the minimum water depth value zmin and the maximum water depth value zmax and storing into the structure Head, wherein establishing of the topography grid for discrete water depth is as shown in FIG. 2.

(3) Establishing of Time Dimension Grid in the Six-Dimensional Grid

The time dimension grid $TIME_{(i,j)}$ is determined by the measuring time $t_k$ of the water depth data set $Z=\{z_k\}_{k=1,n}$ and is established by two manners.

If the time dimension grid $TIME_{(i,j)}$ is synchronously established with the topography dimension grid $DEP_{(i,j)}$ when establishing the topography dimension grid $DEP_{(i,j)}$, directly assign the measuring time $t_k$ of the discrete data set $Z=\{z_k\}_{k=1,n}$ to a time grid point $time_{(i,j)}$; that is, when $z_k$ participates in establishing the topography dimension grid $DEP_{(i,j)}$, $time_{(i,j)}=t_k$; and the data measuring time on the same spatial position is consistent.

If the time dimension grid $TIME_{(i,j)}$ is established after the topography grid $DEP_{(i,j)}$ is established, determining the measuring time $t_k$ through an external variable, determining the measured numerical values in a mapping region polygon Poly within a fixed time t through continuously measuring the water depth value, endowing/allocating a time attribute to the mapping polygon Poly, then carrying out polygon partitioning on the entire mapping region according to the measuring time to form a mapping polygon set $Poly=\{p_k\}_{k=1,n}$, wherein each polygon $p_k$ corresponds to one measuring time $t_k$; and then establishing the time dimension grid $TIME_{(i,j)}$; cycling the mapping polygon $Poly=\{p_k\}_{k=1,n}$, taking the polygon $p_k$ out in sequence, then cycling two-dimensional topography grid $DEP_{(i,j)}$, wherein space and position matching is carried out between each water depth value $dep_{(i,j)}$ measured and $p_k$; that is, when the water depth grid point $dep_{(i,j)}$ is located in the mapping polygon $p_k$, $time_{(i,j)}=t_k$.

Figure 3:
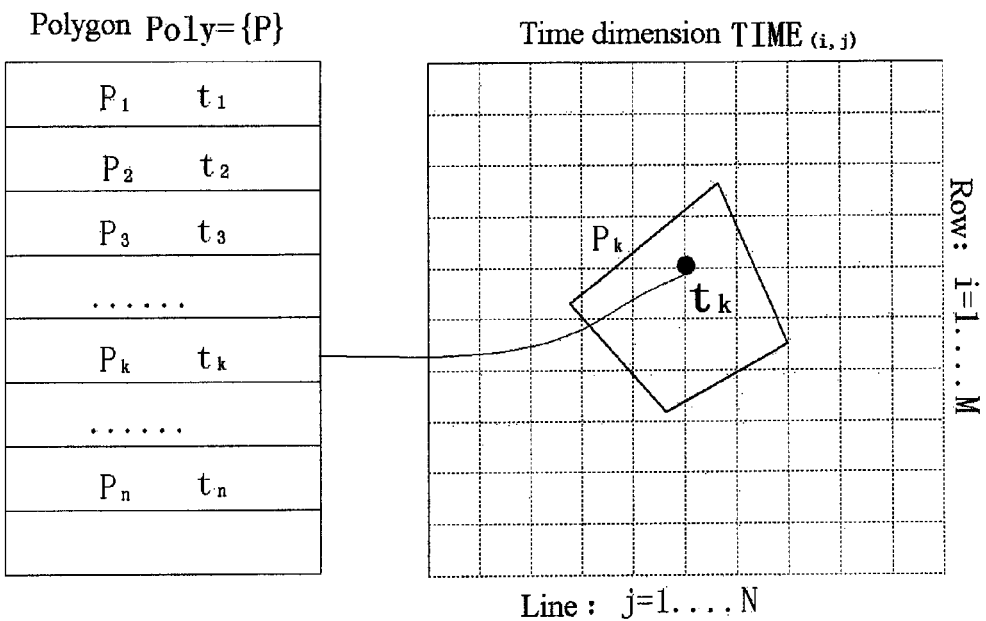
FIG. 3 is establishing of time dimension grid in step (3) of embodiment 1.

Employing the foregoing method to traverse the mapping polygon data set $Poly=\{p_k\}_{k=1,n}$, thus being capable of establishing the time dimension grid $TIME_{(i,j)}$;

Traversing the time dimension grid $TIME_{(i,j)}$, obtaining the minimum time value tmin and the maximum time value tmax and storing into the structure Head, wherein establishing of the time dimension grid is as shown in FIG. 3.

(4) Establishing of Slope Dimension Grid in the Six-Dimensional Grid

The slope dimension grid $SLP_{(i,j)}$ is established based on the topography dimension grid $DEP_{(i,j)}$.

Traversing the slope dimension grid $SLP_{(i,j)}$ takes the grid point $slp_{(i,j)}$ as a center and takes a square R1 using twice $step_{slp}$ as a side length to encircle a calculating point $slp_{(i,j)}$, and water depth points $dep_{(i,j)}$ falling within the square R1 participate in slope calculation to calculate the maximum slope slp $max_{(i,j)}$ and the mean slope $slpmean_{(i,j)}$ of each grid point $slp_{(i,j)}$; the calculating formula of the slope $slp_{(I,J)}$ between each point $dep_{(I,J)}$ and the central point $dep_{(i,j)}$ is:

$$slp_{(I,J)}=\arctan[(dep_{(I,J)}-dep_{(i,j)})/dis]$$

$$dis=\sqrt{(x_{(i,j)}-x_{(I,J)})^2+(y_{(i,j)}-x_{(I,J)})^2}$$

Where, $[x_{(i,j)}, y_{(I,J)}]$ and $[x_{(i,j)}, y_{(I,J)}]$ are respectively the coordinate values of the water depth points $dep_{(i,j)}$ and $dep_{(I,J)}$, and the slope dimension grid $SLP_{(i,j)}$ can be obtained through employing the foregoing method to traverse the topography dimension grid $DEP_{(i,j)}$.

Figure 4:
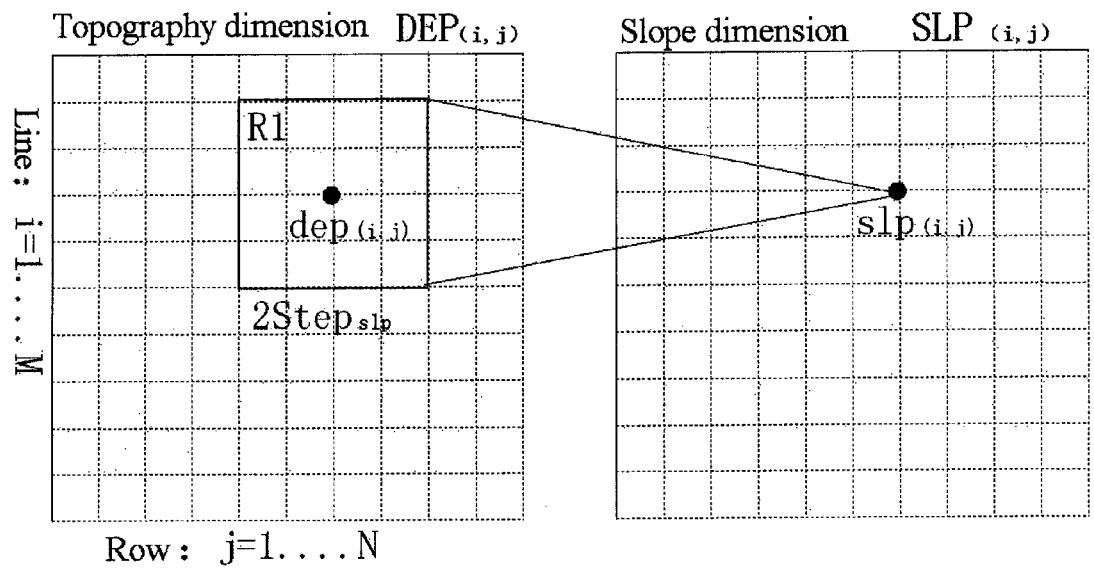
FIG. 4 is establishing of slope grid through topography grid in step (4) of embodiment 1.

Traversing the slope dimension grid $SLP_{(i,j)}$, obtaining the minimum slope value slpmin and the maximum slope value slpmax, and storing into the structure Head, wherein establishing of the slope dimension grid for the topography grid is as shown in FIG. 4.

(5) Establishing of Second Derivative Dimension Grid in the Six-Dimensional Grid The second derivative dimension grid $SEC_{(i,j)}$ can be obtained according to the same method in step (4) by taking the slope dimension grid $SLP_{(I,J)}$ calculated in step (4) as an input variable to replace the topography dimension grid $DEP_{(i,j)}$, wherein the calculating method is as follows:

taking the position of the calculating point $sec_{(i,j)}$ as a center and taking a square R2 using twice $step_{sec}$ as a side length to encircle the calculating point $sec_{(i,j)}$, and slope points $slp_{(I,J)}$ falling within the square R2 participate in second derivative calculation, wherein all the slope points $slp_{(I,J)}$ within the square R2 participate in the second derivative calculation, and the calculating formula of the second derivative $sec_{(I,J)}$ between each point $slp_{(I,J)}$ and the central point $slp_{(i,j)}$ is:

$$sec_{(I,J)}=\arctan[(slp_{(I,J)}-slp_{(i,j)})/dis]$$

$$dis=\sqrt{(x_{(i,j)}-x_{(I,J)})^2+(y_{(i,j)}-x_{(I,J)})^2}$$

Where, $[x_{(i,j)}, y_{(i,j)}]$ and $[x_{(I,J)}, y_{(I,J)}]$ are respectively the coordinate values of the slope points $slp_{(i,j)}$ and $slp_{(I,J)}$, and the second derivative dimension grid $SEC_{(i,j)}$ can be obtained through employing the method to traverse the slope dimension grid $SLP_{(i,j)}$.

Figure 5:
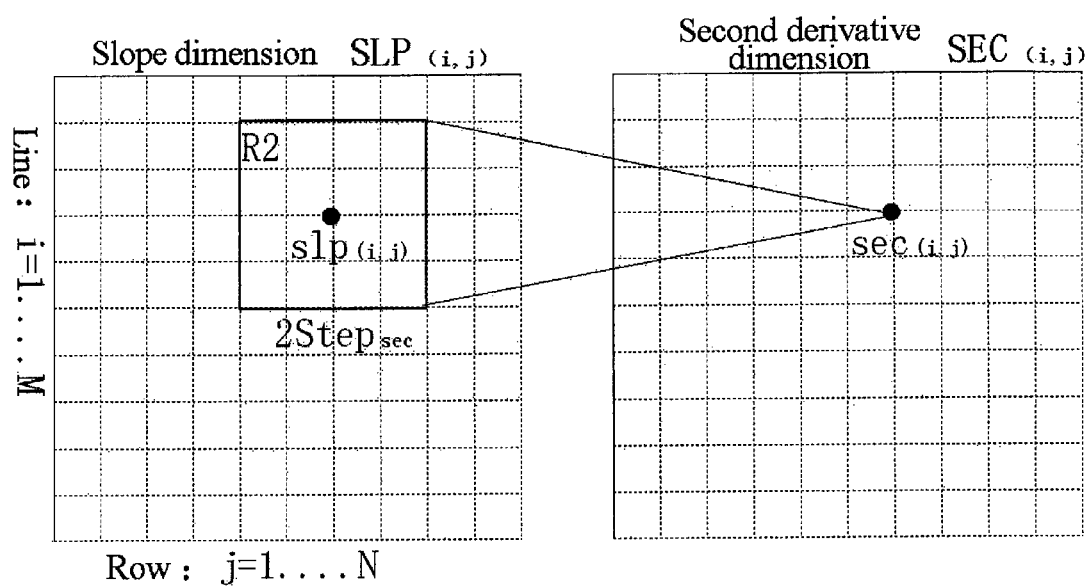
FIG. 5 is establishing of second derivative grid through slope grid in step (5) of embodiment 1.

Traversing the second derivative dimension grid $SEC_{(i,j)}$, obtaining the minimum second derivative value secmin and the maximum second derivative value secmax, and storing into the structure Head, wherein establishing of the second derivative dimension grid through the slope dimension grid is as shown in FIG. 5.

The invention claimed is:

1. A computer implemented submarine topography six-dimensional grid mapping method executed on a processor, comprising the following steps of:
   (1) establishing submarine topography six-dimensional grid structure by
   obtaining discrete X-coordinate, Y-coordinate, water depth value by a submarine coordinate numerical value measuring instrument located under water, and measuring time values by a clock;
   transmitting measured numerical values to a six-dimensional grid structure processing device through the submarine coordinate numerical value measuring instrument, wherein the processing device divides submarine coordinate measured data points into two parts, one part is a head structure "Head" for describing and storing integral information of the grid structure, and the other part is a data set $$GRID(i,j) = \left\{ grid(i,j)_{i=1,M} \atop j=1,N \right\}$$

for storing the grid; wherein
a head structure "Head" consists of eight lines:
a first line refers to mark "Mark";
a second line refers to M and N, representing the line quantity and row quantity of the grid;
a third line refers to xmin and xmax, representing the minimum and maximum values of the X-coordinate of the grid;
a fourth line refers to ymin and ymax, representing the minimum and maximum values of the Y-coordinate of the grid;
a fifth line refers to zmin and zmax, representing the minimum and maximum values of the topography of the grid;
a sixth line refers to tmin and tmax, representing the minimum and maximum values of the time of the grid;
a seventh line refers to slpmin and slpmax, representing the minimum and maximum values of the slope of the grid; and
an eighth line refers to secmin and secmax, representing the minimum and maximum values of the second derivative of the grid;
storing the data set $$GRID(i,j) = \left\{ grid(i,j)_{i=1,M} \atop j=1,N \right\}$$

according to the space sequence of the data points in a two-dimensional orthographic projection plane, wherein each data point $grid_{(i,j)}$ comprises four parameters which are respectively water depth value $dep_{(i,j)}$, time value $time_{(i,j)}$, slope value $slp_{(i,j)}$ and second derivative value $sec_{(i,j)}$, and the X-coordinate value $x_{(i,j)}$ and the Y-coordinate $y_{(i,j)}$ value of the point are calculated according to the line number i and row number j thereof, wherein:

$$x_{(i,j)}=x\min+(i-1)\times x\text{mean}; x\text{mean}=(x\max-x\min)/(N-1);$$

$$y_{(i,j)}=y\min+(j-1)\times y\text{mean}; y\text{mean}=(y\max-y\min)/(M-1);$$

(2) establishing of topography dimension grid in the six-dimensional grid by employing an inverse distance weighting method to establish the topography dimension grid $DEP_{(i,j)}$:

$$dep_{(i,j)} = \left[\sum_{k=1}^{n} w_k z_k\right] / \sum_{k=1}^{n} w_k;$$

$$w_k = 1/d_k^2;$$

$$d_k = \sqrt{(x_{(i,j)}-x_k)^2+(y_{(i,j)}-y_k)^2}$$

where $Z=\{z_k\}_{k=1,n}$ refers to a discrete water depth set, $x_k$ refers to the X-coordinate value of a discrete water depth data point, and $y_k$ refers to the Y-coordinate value of the discrete water depth data point, wherein each discrete water depth data point comprises water depth value $z_k$, X-coordinate value $x_k$, Y-coordinate value $y_k$ and measuring time $t_k$, which are external input variables; $w_k$ refers to the weighted value of the discrete water depth data point, which is a calculation variable; the above-mentioned water depth value $z_k$, X-coordinate value $x_k$ and Y-coordinate value $y_k$ are determined by the measuring of the submarine coordinate numerical value measuring instrument, and the time $t_k$ is determined by the clock;

if topographical change is strongly correlated to the time, establishing the topography dimension grid $DEP_{(i,j)}$ according to the time value $t_k$; that is, when $t_k=T$, the water depth $z_k$ participates in the calculation, T refers to the data measuring time, which is an external variable;

if the topographical change is weekly correlated to the time, the time value $t_k$ does not participate in the calculation;

in the foregoing two cases that the topographical change is strongly correlated to the time and the topographical change is weekly correlated to the time, all the water depth data $z_k$ participating in calculation meets a distance rule that $d_k \leq r$, wherein r refers to a measuring radius;

traversing the topography dimension grid $DEP_{(i,j)}$, obtaining the minimum water depth value zmin and the maximum water depth value zmax and storing into the structure Head;

(3) establishing of time dimension grid in the six-dimensional grid by determining the time dimension grid $TIME_{(i,j)}$ by the measuring time $t_k$ of the water depth data set $Z=\{z_k\}_{k=1,n}$ and establishing the time dimension grid $TIME_{(i,j)}$ by two manners:

if the time dimension grid $TIME_{(i,j)}$ is synchronously established with the topography dimension grid $DEP_{(i,j)}$ when establishing the topography dimension grid $DEP_{(i,j)}$ directly assigning the measuring time $t_k$ of the discrete data set $Z=\{z_k\}_{k=1,n}$ to a time grid point $time_{(i,j)}$; that is, when $z_k$ participates in establishing the topography dimension grid $DEP_{(i,j)}$, $time_{(i,j)}=t_k$; and the data measuring time on the same spatial position is consistent;

if the time dimension grid $TIME_{(i,j)}$ is established after the topography grid $DEP_{(i,j)}$ is established, determining the measuring time $t_k$ through an external variable, determining the measured numerical values in a mapping region polygon "Poly" within a fixed time t through continuously measuring the water depth value, endowing a time attribute to the mapping polygon "Poly", then carrying out polygon partitioning on the entire mapping region according to the measuring time to form a mapping polygon set $Poly=\{p_k\}_{k=1,n}$, wherein each polygon $p_k$ corresponds to one measuring time $t_k$; and then establishing the time dimension grid $TIME_{(i,j)}$; cycling the mapping polygon $Poly=\{p_k\}_{k=1,n}$, taking the polygon $p_k$ out in sequence, then cycling two-dimensional topography grid $DEP_{(i,j)}$, wherein space and position matching is carried out between each water depth value $dep_{(i,j)}$ measured and $p_k$; that is, when the water depth grid point $dep_{(i,j)}$ is located in the mapping polygon $p_k$, $time_{(i,j)}=t_k$; employing the foregoing method to traverse the mapping polygon data set $Poly=\{p_k\}_{k=1,n}$, thus being capable of establishing the time dimension grid $TIME_{(i,j)}$;

traversing the time dimension grid $TIME_{(i,j)}$, obtaining the minimum time value tmin and the maximum time value tmax and storing into the structure Head;

(4) establishing of slope dimension grid in the six-dimensional grid by establishing the slope dimension grid $SLP_{(i,j)}$ based on the topography dimension grid $DEP_{(i,j)}$;

traversing the slope dimension grid $SLP_{(i,j)}$ takes the grid point $slp_{(i,j)}$ as a center and takes a square R1 using twice $step_{slp}$ as a side length to encircle a calculating point $slp_{(i,j)}$, and water depth points $dep_{(i,j)}$ falling within the square R1 participate in slope calculation to calculate the maximum slope $slp\ max_{(i,j)}$ and the mean slope $slp\text{-}mean_{(i,j)}$ of each grid point $slp_{(i,j)}$; the calculating formula of the slope $slp_{(I,J)}$ between each point $dep_{(I,J)}$ and the central point $dep_{(i,j)}$ is:

$$slp_{(I,J)} = \arctan[(dep_{(i,j)} - dep_{(i,j)})/dis]$$

$$dis = \sqrt{(x_{(i,j)} - x_{(I,J)})^2 + (y_{(i,j)} - y_{(I,J)})^2}$$

where, $[x_{(I,J)}, y_{(I,J)}]$ and $[x_{(I,J)}, y_{(I,J)}]$ are respectively the coordinate values of the water depth points $dep_{(i,j)}$ and $dep_{(I,J)}$, and the slope dimension grid $SLP_{(i,j)}$ can be obtained through employing the foregoing method to traverse the topography dimension grid $DEP_{(i,j)}$;

traversing the slope dimension grid $SLP_{(i,j)}$, obtaining the minimum slope value slpmin and the maximum slope value slpmax, and storing into the structure Head;

(5) establishing of second derivative dimension grid in the six-dimensional grid by obtaining the second derivative dimension grid $SEC_{(i,j)}$ according to the same method in step (4) by taking the slope dimension grid $SLP_{(i,j)}$ calculated in step (4) as an input variable to replace the topography dimension grid $DEP_{(i,j)}$, wherein the calculating method is as follows:

taking the position of the calculating point $sec_{(i,j)}$ as a center and taking a square R2 using twice $step_{sec}$ as a side length to encircle the calculating point $sec_{(i,j)}$, and slope points $slp_{(I,J)}$ falling within the square R2 participate in second derivative calculation, wherein all the slope points $slp_{(I,J)}$ within the square R2 participate in the second derivative calculation, and the calculating formula of the second derivative $sec_{(I,J)}$ between each point $slp_{(I,J)}$ and the central point $slp_{(i,j)}$ is:

$$sec_{(I,J)} = \arctan[(slp_{(I,J)} - slp_{(i,j)})/dis]$$

$$dis = \sqrt{(x_{(i,j)} - x_{(I,J)})^2 + (y_{(i,j)} - y_{(I,J)})^2}$$

where, $[x_{(i,j)}, y_{(i,j)}]$ and $[x_{(I,J)}, y_{(I,J)}]$ are respectively the coordinate values of the slope points $slp_{(i,j)}$ and $slp_{(I,J)}$, and the second derivative dimension grid $SEC_{(i,j)}$ can be obtained through employing the method to traverse the slope dimension grid $SLP_{(i,j)}$; traversing the second derivative dimension grid $SEC_{(i,j)}$, obtaining the minimum second derivative value secmin and the maximum second derivative value secmax, and storing into the structure Head.

* * * * *